US012139961B2

(12) United States Patent
Lee

(10) Patent No.: US 12,139,961 B2
(45) Date of Patent: Nov. 12, 2024

(54) FRAME ASSEMBLY SECURING PANELS OF DIFFERING THICKNESSES

(71) Applicant: Overhead Door Corporation, Lewisville, TX (US)

(72) Inventor: Bradley J. Lee, Arlington, TX (US)

(73) Assignee: Overhead Door Corporation, Lewisville, TX (US)

( * ) Notice: Subject to any disclaimer, the term of this patent is extended or adjusted under 35 U.S.C. 154(b) by 183 days.

(21) Appl. No.: 17/872,886

(22) Filed: Jul. 25, 2022

(65) Prior Publication Data

US 2024/0026728 A1 Jan. 25, 2024

(51) Int. Cl.

*E06B 3/54* (2006.01)
*E06B 3/48* (2006.01)
*E06B 3/58* (2006.01)

(52) U.S. Cl.

CPC .............. *E06B 3/549* (2013.01); *E06B 3/485* (2013.01); *E06B 3/5878* (2013.01); *E06B 3/5892* (2013.01)

(58) Field of Classification Search

CPC ........ E06B 3/549; E06B 3/485; E06B 3/5878; E06B 3/5892; E06B 3/5454

See application file for complete search history.

(56) References Cited

U.S. PATENT DOCUMENTS 3,396,503 A 8/1968 Pemberton
3,903,669 A * 9/1975 Pease, Jr. .............. E06B 3/5892 411/339
5,018,330 A * 5/1991 Lewkowitz ........... E06B 3/5892 52/455
5,189,862 A 3/1993 Lafleur
5,249,403 A * 10/1993 Neilly ................... E06B 3/5892 52/204.5
5,470,184 A * 11/1995 Chandler ................ F16B 37/14 52/312
5,577,355 A * 11/1996 Leonelli ................ E06B 3/5892 52/204.597
6,151,849 A * 11/2000 Twigg ................... E06B 3/5892 52/745.15
6,318,037 B1 * 11/2001 Hansen ..................... E06B 1/30 52/204.55
6,467,226 B2 10/2002 Dodson et al.
6,698,145 B2 3/2004 Berger, Jr.
6,708,458 B1 3/2004 Berger, Jr.
6,711,861 B2 3/2004 Berger, Jr.
6,763,638 B1 7/2004 Berger, Jr.

(Continued)

*Primary Examiner* — Jessie T Fonseca
(74) *Attorney, Agent, or Firm* — Haynes and Boone, LLP

(57) ABSTRACT

A bracket set may include an inner frame member comprising: a first barrier-facing surface configured to contact an inner-facing side of the movable barrier; a first panel-facing surface configured to contact a first side of the first panel having the first thickness; a second panel-facing surface configured to contact a first side of the second panel having the second thickness; and an outer frame member comprising: a second barrier-facing surface configured to contact an outer-facing side of the movable barrier; and a third panel-facing surface configured to contact an opposing second side of the first panel having the first thickness when the bracket set is used with the first panel and configured to contact an opposing second side of the second panel having the second thickness when the bracket set is used with the second panel.

22 Claims, 8 Drawing Sheets

(56) References Cited

U.S. PATENT DOCUMENTS

| | | | | |
|---|---|---|---|---|
| 6,837,011 | B2 | 1/2005 | Berger, Jr. | |
| 6,862,850 | B2 | 3/2005 | Berger, Jr. | |
| 7,437,856 | B2 | 10/2008 | Berger, Jr. | |
| 7,954,285 | B2 | 6/2011 | Taylor et al. | |
| 7,971,623 | B2 | 7/2011 | Barnard et al. | |
| 8,201,367 | B2 | 6/2012 | Barnard et al. | |
| 8,640,414 | B2 | 2/2014 | Reyes | |
| 8,813,442 | B1 * | 8/2014 | Edwards | E06B 3/549 52/204.5 |
| 9,022,091 | B2 | 5/2015 | Shives | |
| 9,617,779 | B2 | 4/2017 | Charlton et al. | |
| 10,012,018 | B1 * | 7/2018 | Plummer | E06B 3/5892 |
| 10,030,434 | B1 * | 7/2018 | Plummer | E06B 3/5481 |
| 10,519,711 | B2 | 12/2019 | Alvarez | |
| 10,597,930 | B2 | 3/2020 | Kornish | |
| 10,829,983 | B2 | 11/2020 | Haba et al. | |
| 11,015,383 | B2 | 5/2021 | Charlton et al. | |
| 11,078,717 | B2 | 8/2021 | Vitello et al. | |
| 2003/0019178 | A1 * | 1/2003 | Wang Chen | E06B 3/5892 52/745.16 |
| 2003/0024182 | A1 * | 2/2003 | Yeany | E06B 1/30 52/204.55 |
| 2003/0041539 | A1 | 3/2003 | Bernacki et al. | |
| 2003/0066256 | A1 * | 4/2003 | DeBlock | B32B 17/10045 52/204.67 |
| 2003/0115811 | A1 * | 6/2003 | Sibbett | E06B 3/5892 52/204.55 |
| 2006/0080924 | A1 * | 4/2006 | Sibbett | E06B 3/5892 52/455 |
| 2006/0198124 | A1 * | 9/2006 | Copland | E06B 3/5892 362/145 |
| 2007/0193140 | A1 * | 8/2007 | Carnick | E06B 3/5892 52/208 |
| 2009/0241422 | A1 | 10/2009 | Mock et al. | |
| 2010/0064625 | A1 | 3/2010 | Charlton et al. | |
| 2014/0262072 | A1 * | 9/2014 | Shives | E06B 3/5892 160/405 |
| 2015/0247355 | A1 * | 9/2015 | Badger | E06B 3/5892 52/745.19 |
| 2017/0167185 | A1 | 6/2017 | Boer | |
| 2018/0238102 | A1 * | 8/2018 | Kornish | E06B 3/485 |
| 2018/0313137 | A1 * | 11/2018 | Plummer | E06B 3/58 |
| 2019/0257138 | A1 | 8/2019 | Vitello | |
| 2020/0256115 | A1 | 8/2020 | Vitello | |
| 2021/0246713 | A1 | 8/2021 | Kozisek et al. | |
| 2021/0293082 | A1 | 9/2021 | Webb et al. | |
| 2021/0348438 | A1 | 11/2021 | Wood et al. | |

* cited by examiner

FRAME ASSEMBLY SECURING PANELS OF DIFFERING THICKNESSES

TECHNICAL FIELD

The present disclosure relates generally to the field of movable barrier operator systems. In particular, a frame assembly includes an inner frame member with multiple bearing surfaces used to secure multiple panels of differing thicknesses.

BACKGROUND

Movable barriers, such as upward-acting sectional or single panel garage doors, residential and commercial rollup doors, and slidable and swingable gates, are used to alternatively allow and restrict entry to building structures and property. These movable barriers may include transparent or semi-transparent panels, such as windows or glazings. Such panels may contribute to the aesthetic appeal of a movable barrier as well as allow natural light to enter the space enclosed by the movable barrier.

Transparent panels within a movable barrier are typically mounted in place with a lite frame assembly. A lite frame assembly typically includes an outer frame member and an inner frame member. Outer frame members and inner frame members are positioned around the perimeter of the transparent panels. As a fastener draws the outer member toward the inner member, surfaces of the outer member and inner member contact the transparent panel securing it in place.

Typically, the outer frame member and inner frame member of a lite frame assembly may be designed to secure a transparent panel of one specific thickness to the movable barrier. As a result, any variation in the thickness of the transparent panel to be mounted within a movable barrier requires a different lite frame assembly. As a result, to install or service movable barriers with transparent panels, a manufacturer must manufacture several different types of outer frame members and/or inner frame members to accommodate panels of differing thicknesses. Manufacturing a greater variety of parts is often more expensive than manufacturing larger quantities of the same structure. In addition, installers of movable barriers with varying thicknesses of transparent panels must maintain an inventory with a greater number of parts including outer frame members or inner frame members for the differing panels. Installers must also transport and use more components to install or service such movable barriers.

SUMMARY

In some example aspects, the present disclosure is directed to a bracket set usable to secure a first panel having a first thickness or a second panel having a second thickness in a movable barrier. The bracket set may include an inner frame member comprising: a first barrier-facing surface configured to contact an inner-facing side of the movable barrier; a first panel-facing surface configured to contact a first side of the first panel having the first thickness; a second panel-facing surface configured to contact a first side of the second panel having the second thickness; and an outer frame member comprising: a second barrier-facing surface configured to contact an outer-facing side of the movable barrier; and a third panel-facing surface configured to contact an opposing second side of the first panel having the first thickness when the bracket set is used with the first panel and configured to contact an opposing second side of the second panel having the second thickness when the bracket set is used with the second panel.

In some aspects, the inner frame member further comprises a fourth panel-facing surface configured to contact a first side of a third panel having a third thickness, and wherein the third panel-facing surface is further configured to contact an opposing second side of the third panel having the third thickness when the bracket set is used with the third panel. In some aspects, the first panel and the second panel are transparent. In some aspects, the first panel and the second panel are glass panels. In some aspects, the bracket set further comprises a sealant positioned between the second barrier-facing surface and the outer-facing side of the movable barrier. In some aspects, the bracket set further comprises a sealant positioned between the third panel-facing surface and the opposing second side of the first panel when the bracket set is used with the first panel or positioned between the third panel-facing surface and the opposing second side of the second panel when the bracket set is used with the second panel. In some aspects, the second barrier-facing surface of the outer frame member further comprises a groove configured to receive a seal. In some aspects, the third panel-facing surface of the outer frame member further comprises a groove configured to receive a seal. In some aspects, the inner frame member further comprises a recess configured to receive a fastener, and wherein the outer frame member further comprises a recess configured to receive the fastener. In some aspects, the fastener is configured to secure the outer frame member and the inner frame member to the first panel when the bracket set is used with the first panel or secure the outer frame member and the inner frame member to the second panel when the bracket set is used with the second panel.

In some example aspects, the present disclosure is directed to a bracket set usable to secure a first panel having a first thickness or a second panel having a second thickness in a movable barrier. The bracket set includes an inner frame member securable relative to an inner-facing side of the movable barrier, the inner frame member comprising: a first surface configured to contact a first side of the first panel having the first thickness; a second surface configured to contact a first side of the second panel having the second thickness; and an outer frame member securable relative to an outer-facing side of the movable barrier, the outer frame member comprising: a third surface configured to contact an opposing second side of the first panel having the first thickness when the bracket set is used with the first panel and configured to contact an opposing second side of the second panel having the second thickness when the bracket set is used with the second panel.

In some aspects, the first thickness is ⅛ inches. In some aspects, the second thickness is ½ inches. In some aspects, the inner frame member further comprises a fourth panel-facing surface configured to contact a first side of a third panel having a third thickness, and wherein the third panel-facing surface is further configured to contact an opposing second side of the third panel having the third thickness when the bracket set is used with the third panel.

In some example aspects, the present disclosure is directed to a bracket set usable to secure a plurality of panels of a plurality of thicknesses. The bracket set includes an inner frame member comprising: a first barrier-facing surface configured to contact an inner-facing side of a movable barrier; and a plurality of panel-facing surfaces, each of the plurality of panel-facing surfaces configured to contact a first side of a corresponding panel of the plurality of panels, wherein each corresponding panel of the plurality of panels has a different thickness; and an outer frame member comprising: a second barrier-facing surface configured to contact an outer-facing side of the movable barrier; and a second panel-facing surface configured to contact an opposing second side of each of the plurality of panels.

In some aspects, the plurality of panels includes a first panel having a first thickness; the plurality of panel-facing surfaces includes a first panel-facing surface configured to contact a first side of the first panel; and the second barrier-facing surface of the outer frame member is configured to contact an opposing second side of the first panel. In some aspects, the plurality of panels includes a second panel having a second thickness; the plurality of panel-facing surfaces includes a second panel-facing surface configured to contact a first side of the second panel; and the second barrier-facing surface of the outer frame member is configured to contact an opposing second side of the second panel. In some aspects, the second barrier-facing surface of the outer frame member further comprises a groove configured to receive a seal. In some aspects, the second panel-facing surface of the outer frame member further comprises a groove configured to receive a seal. In some aspects, the inner frame member further comprises a recess configured to receive a fastener, wherein the fastener is configured to secure the outer frame member and the inner frame member to at least one corresponding panel of the plurality of panels.

In some example aspects, the present disclosure is directed to a bracket set for securing a panel on a door. The bracket set includes a first frame member comprising a first bearing surface configured to bear against a first surface of the panel; and a second frame member comprising: a second bearing surface spaced a first distance from the first bearing surface when the first frame and the second frame are in place on the door, the second bearing surface configured to selectively bear against a second surface of the panel when the panel has a first thickness, and a third bearing surface spaced a second distance from the first bearing surface when the first frame and the second frame are in place on the door, the third bearing surface configured to bear against a second surface of the panel when the panel has a second thickness.

It is to be understood that both the foregoing general description and the following drawings and detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following. One or more features of any implementation or aspect may be combinable with one or more features of other implementation or aspect.

BRIEF DESCRIPTION OF THE DRAWINGS

The accompanying drawings illustrate implementations of the systems, devices, and methods disclosed herein and together with the description, serve to explain the principles of the present disclosure.

Figure 1:
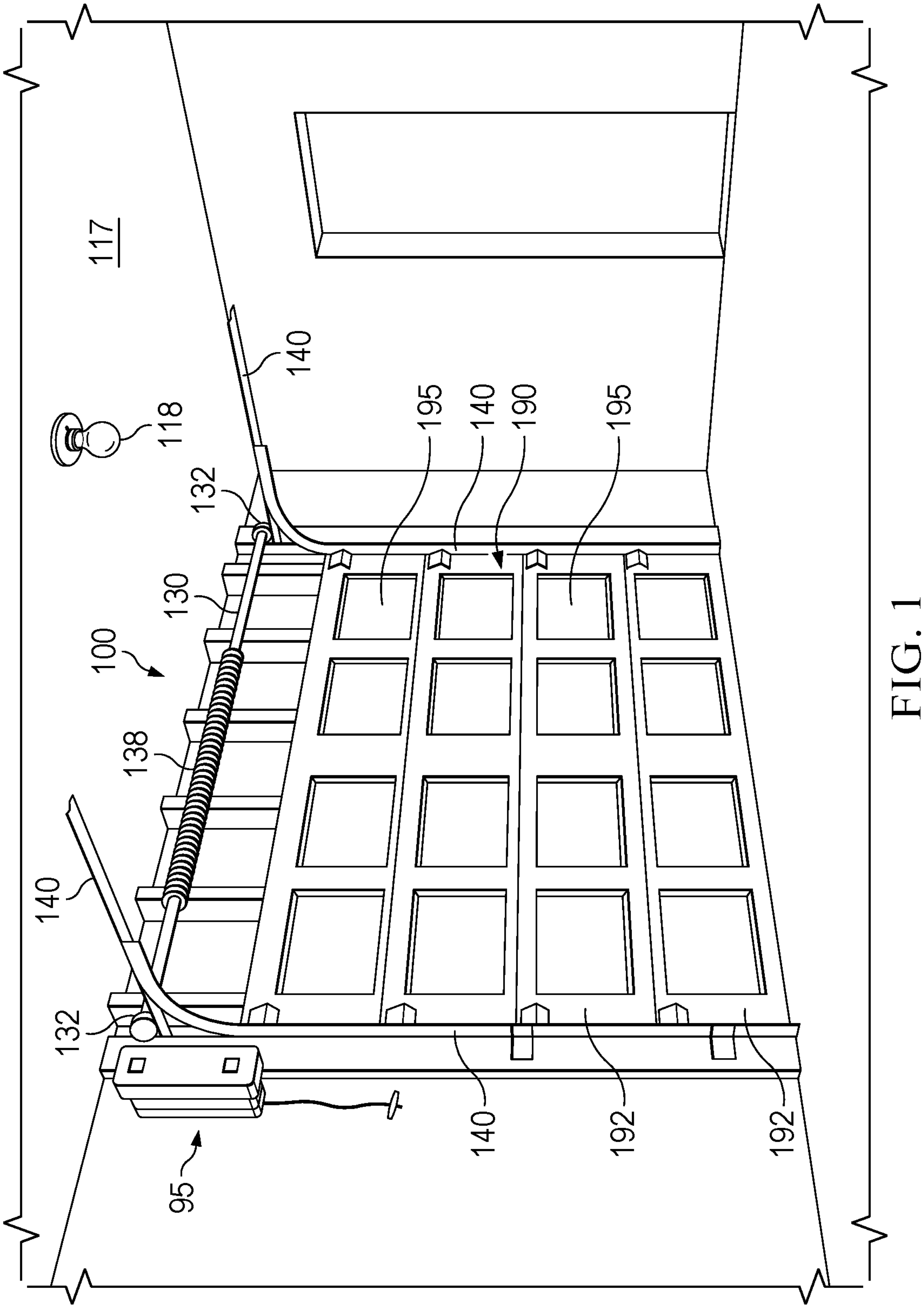
FIG. 1 is a perspective illustration of a movable barrier system, according to aspects of the present disclosure.

These Figures will be better understood by reference to the following detailed description.

DETAILED DESCRIPTION

For the purpose of promoting an understanding of the principles of the present disclosure, reference will now be made to the implementations illustrated in the drawings and specific language will be used to describe them. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In addition, this disclosure describes some elements or features in detail with respect to one or more implementations or Figures, when those same elements or features appear in subsequent Figures, without such a high level of detail. It is fully contemplated that the features, components, and/or steps described with respect to one or more implementations or Figures may be combined with the features, components, and/or steps described with respect to other implementations or Figures of the present disclosure. For simplicity, in some instances the same or similar reference numbers are used throughout the drawings to refer to the same or like parts.

Some aspects of this disclosure teach a movable barrier having an outer frame member and an inner frame member that cooperate to securely accommodate panels of different thicknesses. In some examples, this is accomplished because the frame members may have differently spaced bearing surfaces that engage against the panel and hold it in place. The frame members may be positioned along a perimeter of the panel (which may be glaze panel) of the movable barrier on an outer and inner side. In some examples, the outer frame member may include a bearing surface which bears against the outer surface of the glaze panel. The inner frame member may includes multiple bearing surfaces for bearing against inner surfaces of the glaze panels of different thicknesses. For example, one bearing surface of the inner frame member may be sized and shaped to bear against the inner surface of a glaze panel of ⅛" thickness. Another bearing surface of the inner frame member may be sized and shaped to bear against the inner surface of a glaze panel of ½" thickness. The inner frame member may include additional bearing surfaces for bearing against panels of additional thicknesses.

FIG. 1 is a perspective illustration of an example movable barrier system, according to aspects of the present disclosure. In this example, the movable barrier is an upward acting garage door. In some examples, the movable barrier may be a sectional-type garage door. FIG. 1 illustrates a movable barrier 190 and a barrier operator 95. In some implementations, the movable barrier 190 may include multiple panels 195. The panels 195 may be positioned within the movable barrier 190 and may be transparent or non-transparent. The panels 195 may be secured within the movable barrier 190 with lite frame assemblies. The lite frame assemblies may include outer frame members 220 (shown and described with reference to FIGS. 2A and 3A-3C) and inner frame members 230, shown surrounding the panels 195 in FIG. 1 as shown.

In some implementations, the barrier system 100 described herein may be referred to as a movable barrier system, a door system, a garage door system, a gate system, or any other similar term. In some implementations, the movable barrier 190 may be referred to as a barrier, a door, a garage door, a sectional garage door, an upward acting garage door, a gate, a movable gate, a sliding gate, or any other similar term. In some implementations, the barrier operator 95 may alternatively be referred to as an operator, a door operator, a garage door operator, a gate operator, an opener, a door opener, a garage door opener, a gate opener, a control system, or any other similar term. In some implementations, the light fixture 118 may be referred to as a light, a light system, or any other similar term.

FIG. 1 shows that the movable barrier 190 provides access to a space or a room having a ceiling 117 and the light fixture 118 that is spaced from the barrier operator 95. The movable barrier 190 may provide selective access to the space. The barrier operator 95 may be any suitable type of barrier operator. For example, in some implementations, the barrier operator 95 may be a jackshaft operator. In other implementations, the barrier operator 95 may be a direct drive wall or ceiling mounted operator, a belt driven operator, a chain driven operator, a screw drive operator, a trolley operator, a carriage operator, or any other type of barrier operator. The barrier operator 95 may include any suitable components. As shown in FIG. 1, the barrier operator 95 may be disposed adjacent the movable barrier 190. For example, in the implementation shown, the barrier operator 95 may be positioned on the same wall as the opening covered by the movable barrier 190. However, the barrier operator 95 may be positioned at any other location within the room shown in FIG. 1. For example, the barrier operator 95 may be affixed to the ceiling 117. In some implementations, the barrier operator 95 may be positioned on a different wall of the room or on the floor of the room. In some implementations, particularly in an implementation in which the barrier operator 95 is affixed or otherwise positioned on the ceiling 117 of the room, the light fixture 118 may be attached to, or a part of, the barrier operator 95.

Any suitable structures or components may be implemented to facilitate movement of the movable barrier 190 between a closed position and an open position. In the example shown in FIG. 1, the movable barrier 190 may be moved along one or more tracks 140. Additionally shown in FIG. 1 is a shaft 130, cable drums 132, and a torsion spring 138.

Components of the barrier system 100 shown in FIG. 1 may include any other suitable components. For example, the barrier system 100 may include rollers positioned on the movable barrier 190 or the tracks 140. The system 100 may include sensors, such as safety sensors configured to detect the presence or motion of an object or person, seals positioned along any portion of the movable barrier 190 or the corresponding opening, tracks, cables, or tube shafts. The system may include extension springs to further reduce necessary rotational force of a motor, a motor rail, belts, motor head, motor arms, lift handles for manual operation, emergency release ropes, or any other suitable components.

It is noted that the movable barrier 190 may include any number of sections (e.g., sections 192*a-d*), including a number of sections greater or less than those shown. Additionally, any of the sections 192*a-d* may include any number of roller brackets of various types. The movable barrier 190 may be a four-section barrier, such as the movable barrier 190 on a straight vertical track.

Figure 2A:
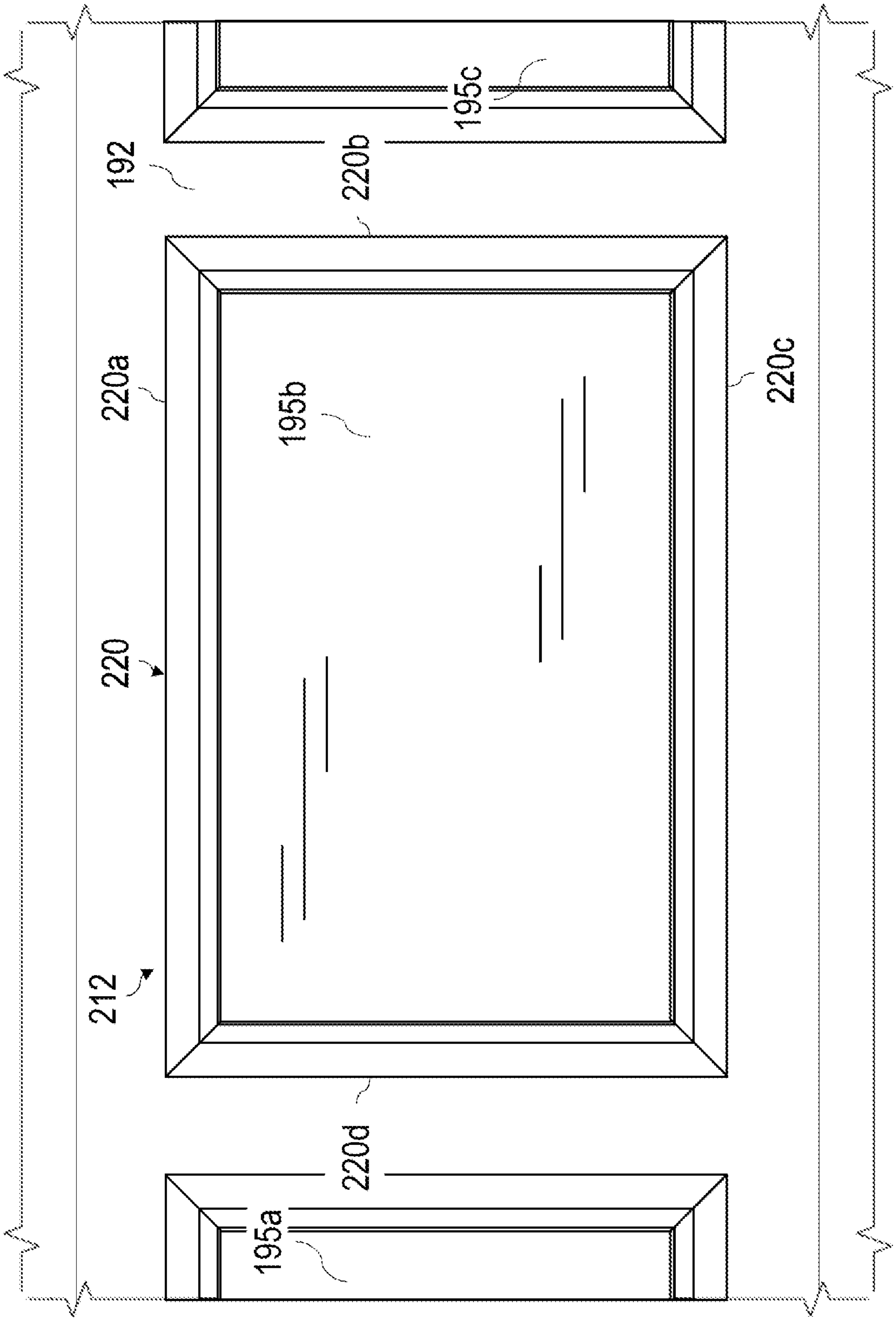
FIG. 2A is a front view of a section of a movable barrier, according to aspects of the present disclosure.

FIG. 2A is a front view of a section of the movable barrier 190, according to aspects of the present disclosure. FIG. 2A depicts a view of an exterior side of the movable barrier 190. In that regard, FIG. 2A shows an outer surface of the movable barrier 190 with an opening 212. The opening 212 may be defined by a frame 220 surrounding the opening. A panel 295*b* is disposed within the opening 212. The frame 220, when shaped to form a rectangle, may include an upper length 220*a* of an outer frame member, a right length 220*b* of the outer frame member, a lower length 220*c* of the outer frame member, and a left length 220*d* of the outer frame member. FIG. 2A also depicts additional panels and surrounding outer frame members, including panel 295*a* to the left of the panel 295*b* and panel 295*c* to the right of the panel 295*b*. In that regard, the movable barrier 190 may include multiple openings similar to the opening 212. Multiple panels, such as the panels 295 shown in FIG. 2A may be positioned within the openings. In some aspects, the movable barrier 190 may include multiple horizontally extending sections.

The horizontally extending sections may be hingedly connected so as to allow the movable barrier to flex or alter its shape as it travels along the guide rails 140 (FIG. 1) between a close and an open position. Multiple horizontally extending sections may be arranged vertically relative to one another to form the movable barrier 190.

The panels 295 shown and described with reference to FIG. 2A may be any suitable type of panels. For example, the panels 295 may include transparent or non-transparent panels. The panels 295 may be constructed of any suitable material. For example, the panels may be constructed of glass, acrylic, plastic, polycarbonate, or any other material. In some implementations, the panels 295 may include various coatings, films, glazings, or additional outer layers which may provide additional functionality to the panels 295. In some implementations, the panels 295 may be single pane windows or have multiple panes. The panels 295 shown and described herein may also be referred to as windows, glazings, glazed windows, lites, or any other term.

Figure 2B:
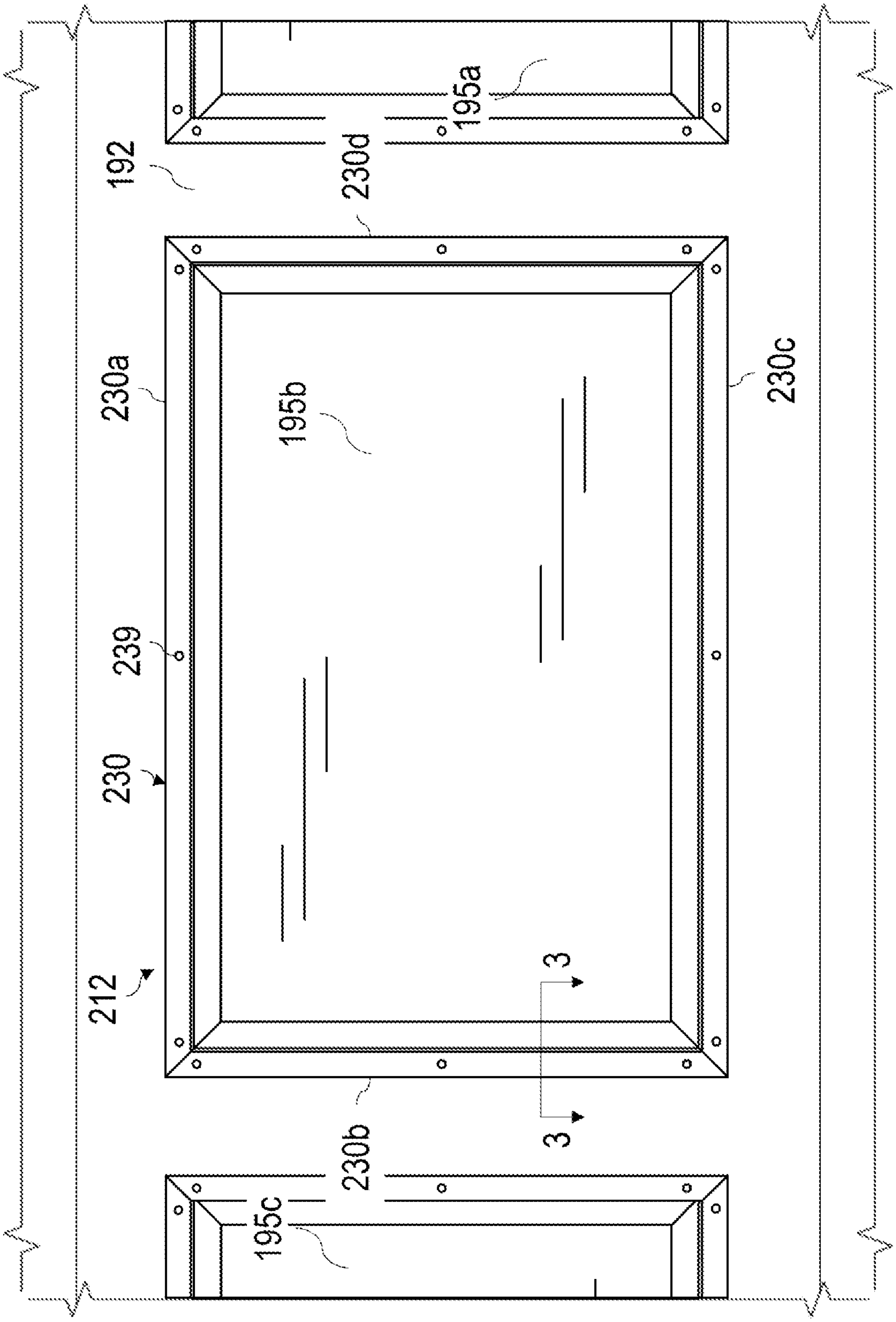
FIG. 2B is a rear view of a section of a movable barrier, according to aspects of the present disclosure.

During an installation of a panel, such as the panel 295*b*, the panel 295*b* may be positioned within the opening 212 of the movable barrier 190. In some implementations, the length and/or width of the panel 295*b* may be less than the length and/or width of the opening 212 of the movable barrier 190. In this case, a gap between the inner surface of the opening 212 and the outer edge of the panel 295*b* may exist. The outer frame member 220 and an inner frame member 230 (FIG. 2B) may be positioned on an outer and inner side of the perimeter of the panel 295*b* and an outer and inner surface of the movable barrier 190 around the opening 212 such that the gap between the movable barrier and the panel 295*b* is covered by the outer frame member 220, as shown in FIG. 2A, and the inner member 230 as shown in FIG. 2B. In this way, the outer frame member 220 may cover an outward-facing region surrounding the opening 212 as well as an outward facing perimeter region of the panel 295*b* as shown.

As also shown in FIG. 1, any number of panels 295 may be positioned within the movable barrier 190. For example, the movable barrier 190 may include any number of openings, such as the opening 212, and a panel 295 may be positioned within each opening 212 of the movable barrier 190. It is noted that the panels 295 and corresponding openings 212 may be of any suitable dimension. In one implementation, to accommodate for any suitable size of openings 212 or panels 295, the outer frame member 220 and or the inner frame member 230 (shown in FIG. 2B) may be manufactured by extruding a material to create elongate assembly members. During an installation procedure, an installer may cut the extruded pieces to fit custom openings 212 and corresponding panels 295. For example, as shown in FIG. 2A, the upper outer frame member 220*a* may be cut at 45° angles at both ends so as to correspond to the length of the panel 295*b* and to abut the neighboring lengths 220*b* and 220*d*. In other implementations, the outer frame member 220 and/or the inner frame member 230 may be constructed by an injection molding process. In some implantations, an injection molding process may involve higher tooling setup costs, but lower per-piece cost than the extrusion process described above. As a result, the proposed lite frame assembly may make injection molding manufacturing a more cost-effective option for manufacturers of lite frame assembly components. In some implementations, sections of the outer frame number 220 may be manufactured according to preset lengths.

FIG. 2B is a rear view of a section of a movable barrier, according to aspects of the present disclosure. FIG. 2B depicts a view of an interior side of the movable barrier 190. In that regard, FIG. 2B shows an inner surface of the movable barrier 190 including the opening 212, the panel 295*b*, and an inner frame member 230. The inner frame member 230 may include an upper length 230*a* of an inner frame member, a right length 230*b* of the inner frame member, a lower length 220*c* of the inner frame member, and a left length 220*d* of the inner frame member. FIG. 2B also depicts the additional panels shown in FIG. 2A as well as corresponding inner frame members. Shown left of the panel 295*b* is the panel 295*c* and right of the panel 295*b* is the panel 295*a*.

The gap between the inner surface of the opening 212 and the outer edge of the panel 295*b* may be covered by inner frame member 230. The inner frame member 230 covers an inward-facing region of the movable barrier 190 surrounding the opening 212 as well as an inward facing perimeter region of the panel 295*b* as shown.

As shown in FIG. 2B, when the inner frame member 230 is arranged in a rectangular shape, the inner frame member 230 may include four lengths, including an upper length 230*a*, a left length 230*b*, a lower length 230*c*, and a right length 230*d*. The upper length 230*a* may engage with the upper length 220*a* of the outer frame member 220. The left length 230*b* may engage with the right length 220*b* of the outer frame member 220. The lower length 230*c* may engage with the lower length 220*c* of the outer frame member 220. The right length 230*d* may engage with the left length 220*d* of the outer frame member 220.

Also shown in FIG. 2B, and as shown and described in more detail with reference to FIG. 3A, the inner frame member 230, including the four sections previously described, include multiple openings 239 through which a fastener is inserted through the inner frame member and engages with corresponding components of the outer frame member. As the fasteners within the recesses 239 are tightened, the outer frame member 220 and inner frame member 230 are urged toward one another securing the panel 295*b* in place.

The frame members described herein, including the outer frame member 220 and the inner frame member 230, may be constructed of any suitable materials. For example, the outer frame member 220 and inner frame member 230 may be made of vinyl, aluminum, fiberglass, PVC, or various composite materials, as well as any other suitable materials.

Figure 3A:
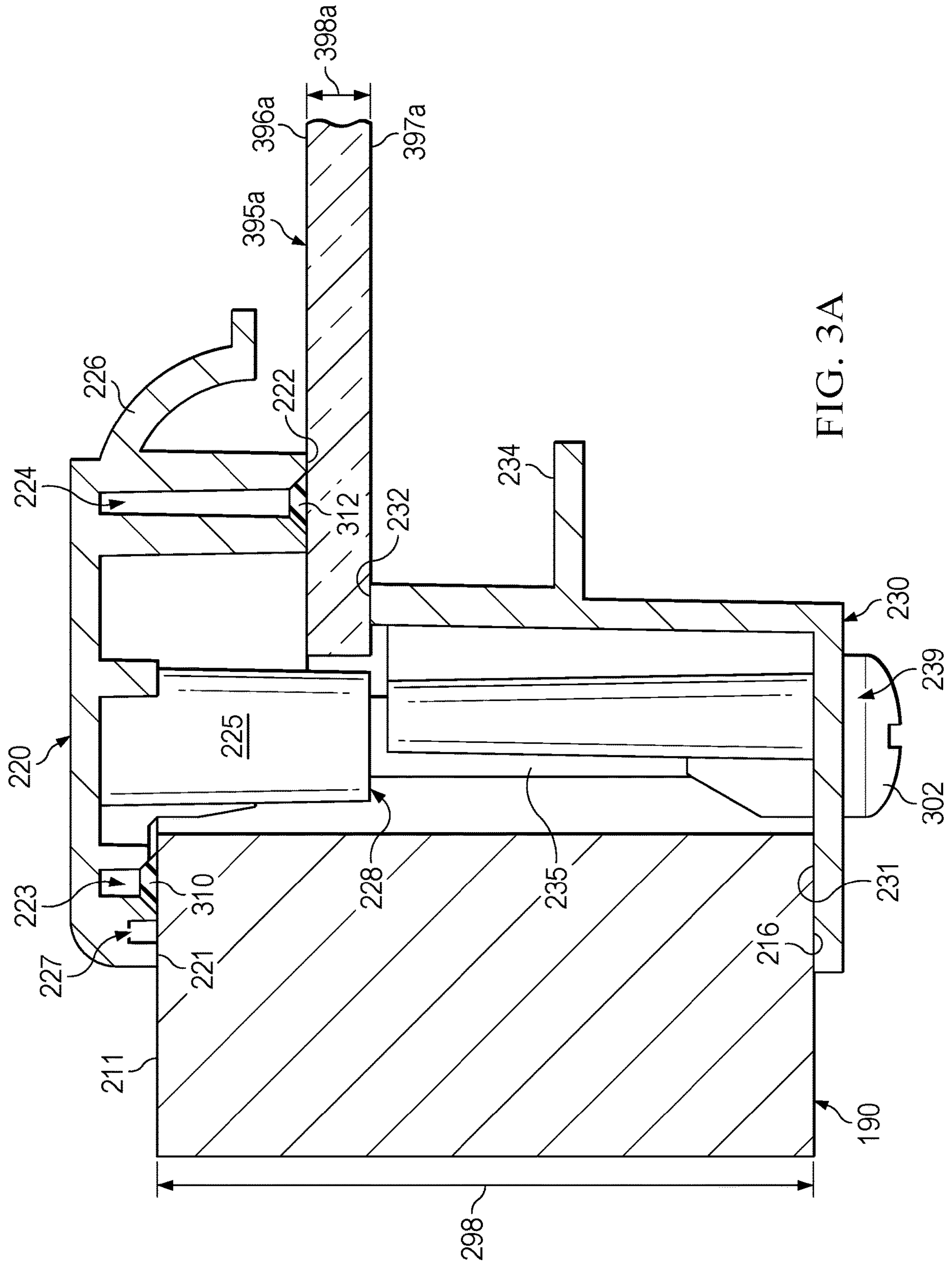
FIG. 3A is a cross-sectional side view of a panel within a movable barrier and positioned between an outer frame member and an inner frame member, according to aspects of the present disclosure.

FIG. 3A is a cross-sectional side view of a panel 395*a* within the movable barrier 190 and positioned between the outer frame member 220 and the inner frame member 230, according to aspects of the present disclosure. FIG. 3A shows a downward facing cross-sectional view of the junction of the movable barrier and a panel 395*a* secured by the outer frame member 220 and the inner frame member 230. The cross-sectional view shown in FIG. 3A is shown by the cross-sectional arrows 3 in FIG. 2B. However, the cross-sectional view shown in FIG. 3A may also correspond to a side facing cross-sectional view of lengths 220*a* and 230*a* or 220*c* and 230*c*. and/or an upward facing cross-sectional view of 220*d* and 230*d*.

The movable barrier 190 may be of any thickness. In the implementation shown in FIG. 3A, the movable barrier 190 may be of a thickness 298. The movable barrier 190 may also include an outward facing surface 211 and an inward facing surface 216.

FIG. 3A also includes a view of the panel 395*a*. The panel 395*a* may be similar to any of the panels 295 described with reference to FIGS. 2A and 2B. The panel 395*a* may be of a thickness 398*a*. The thickness 398*a* may be any thickness. In one implementation, the thickness 398*a* may be ⅛". As shown in FIG. 3A, the panel 395*a* may include an outward facing surface 396*a* and an inward facing surface 397*a*.

As shown in FIG. 3A, the outer frame member 220 is positioned so as to contact the outward facing surface 211 of the movable barrier 190 and the outward facing surface of the 396*a* of the panel 395*a*. For example, an inward facing surface 221 of the outer frame member 220 may contact the outward facing surface 211 of the movable barrier 190. Specifically, a region of the outward facing surface 211 along a perimeter of the opening 212 of the movable barrier 190 may contact and/or be covered by a portion of the outer frame member 220, as shown.

In some implementations, the outer frame member 220 may include a groove 223. The groove 223 may be positioned within the outer frame member 220 along the inward facing surface 221. The groove may be configured to receive a seal 310. The seal 310 may be any suitable type of seal, including a flexible elongate material or a flexible member of a closed shape extending around the opening 212 of the movable barrier 190. The seal may be a washer, gasket, including both inflexible and flexible materials. In some implementations, the seal may be an elastic stripping. In some implementations, the seal may be constructed by applying a liquid or semi-liquid substance within the groove 223 or along the outer surface 211 of the movable barrier 190 which is later cured to form an elastic or in-elastic solid material. In some embodiments, the seal 310 may additionally act as an adhesive. As shown in FIG. 3A, the inward facing surface 221 of the outer frame member 220 may include additional grooves. Such grooves may also receive seals and/or adhesives or may serve other functions.

As shown in FIG. 3A, the outer frame member 220 is shaped so as to contact the outward facing surface 396*a* of the panel 395*a*. For example, an inward facing bearing surface 222 of the outer frame member 220 may contact the outward facing surface 396*a* of the panel 395*a*. Specifically, a region of the outward facing surface 396*a* along a perimeter of the panel 395*a* may contact and/or be covered by a portion of the outer frame member 220, as shown.

In some implementations, the outer frame member 220 may include a groove 224. The groove 224 may be positioned within the outer frame member 220 along the inward facing bearing surface 222. The groove may be shaped to receive a seal 312. The seal 312 may be any suitable type of seal, including any of those listed with reference to the seal 310.

In some implementations, the outer frame member 220 may additionally include an arm 226. The arm 226 may be positioned along an inner edge of the outer frame member. In some implementations, the arm 226 may be sloped, rounded, or curved as shown in a direction towards the panel 395*a*. In some implementations, a portion of the arm 226 may contact the outer surface 395*a* of the glass.

The outer frame member may additionally include a chamber 225. The chamber 225 may include a recess 228 configured to receive a fastener 302, as will be explained in more detail hereafter.

The inner frame member 230 is also shown in FIG. 3A. The inner frame member 230 is shaped and positioned so as to contact the inward facing surface 216 of the movable barrier 190 and the inward facing surface 397*a* of the panel 395*a*. For example, a surface 231 of the inner frame member 230 may face the movable barrier 190 and may contact the inward facing surface 216 of the movable barrier 190. Specifically, a region of the inward facing surface 216 along a perimeter of the opening 212 of the movable barrier 190 may contact and/or be covered by a portion of the inner frame member 230, as shown.

The inner frame member may include a bearing surface 232 and a bearing surface 234. As will be explained and shown with reference to FIG. 3B, the surfaces 232 and 234 may be sized, shaped, and positioned to contact and secure panels of different thicknesses using the same inner frame member 230. For example, as shown in FIG. 3A, the bearing surface 232 may be sized, shaped, and positioned so as to contact the inward facing surface 397*a* of the panel 395*a*. As will be shown with reference to FIG. 3B, the bearing surface 234 may be sized, shaped, and positioned so as to contact an inward facing surface 397*b* of a panel 395*b*, where the thickness 398*b* of the panel 395*b* is greater than the thickness 398*a* of the panel 395*a*.

The inner frame member 230 may additionally include a region 235. The region 235 may include a recess 239 through which the fastener 302 may be positioned. In this way, after the panel 395*a* is positioned between the outer frame member 220 and the inner frame member 230, the fastener 302 may be inserted through the recess 239 of the inner frame member 230 and received into the recess 228 of the outer frame member 220. In some implementations, the recess 228 may be threaded with threads corresponding to threads of the fastener 308. In some implementations, the fastener 302 may be a self-tapping fastener. As the fastener 302 is engaged, it urges the outer frame member 220 and the inner frame member 230 toward one another such that the inward facing surface 221 bears against the outward facing surface 211, the inward facing bearing surface 222 bears against the outer surface 396*a*, the surface 231 bears against the inward facing surface 216, and the bearing surface 232 bears against the inner surface 397*a*. In this way, the panel 395*a* is secured between the outer frame member 220 and the inner frame member 230 and the outer frame member 220 and inner frame member 230 grip the perimeter around the opening 212 (FIG. 2A) of the movable barrier 190.

Figure 3B:
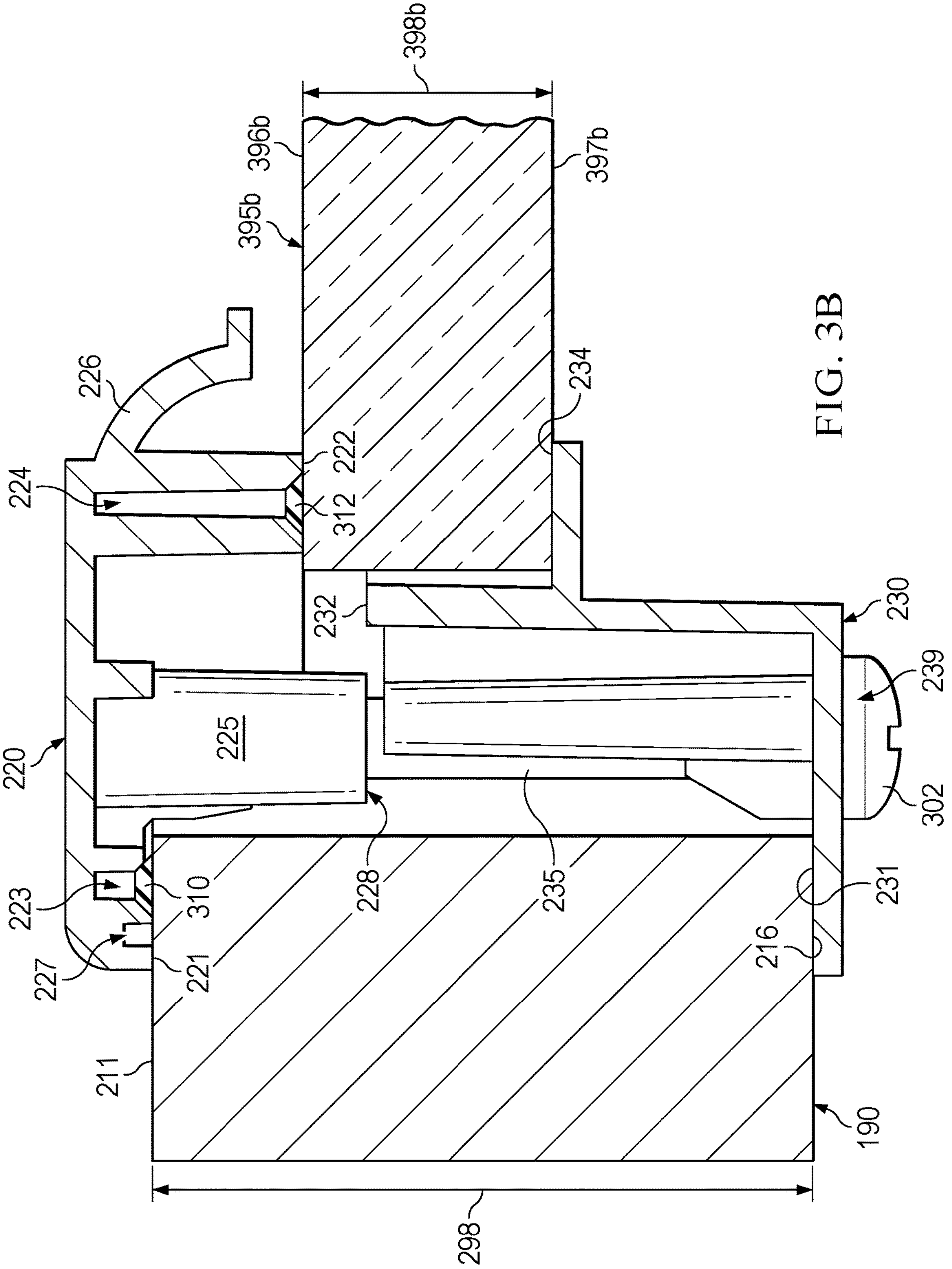
FIG. 3B is a cross-sectional side view of a panel within a movable barrier and positioned between an outer frame member and an inner frame member, according to aspects of the present disclosure.

As shown in FIG. 3A, the outer frame member 220 and the inner frame member 230 may be sized and shaped to secure the panel 395*a* of the thickness 398*a* to the movable barrier 190 of a thickness 298 with the panel 395*a* contacting the bearing surface 232. As shown in FIG. 3B, the outer frame member 220 and the inner frame member 230 may also be sized and shaped to secure the panel 395*b* of the thickness 398*b* to the same movable barrier 190 with the panel 395*b* contacting the bearing surface 234. For example, the distance between the bearing surface 222 of the outer frame member 220 and the bearing surface 232 of the inner frame member 230 when the outer frame member 220 and the inner frame member 230 are installed may be substantially similar to the thickness 398*a*. Similarly, the distance between the bearing surface 222 of the outer frame member 220 and the bearing surface 234 of the inner frame member 230 when the outer frame member 220 and the inner frame member 230 are installed may be substantially similar to the thickness 398*b* (FIG. 3B).

Aspects of the disclosed inner frame member 230 may advantageously reduce the number of parts manufactured for movable barriers with transparent panels. For example, because the inner frame member 230 includes multiple surfaces (e.g., the bearing surface 232 and the bearing surface 234) sized and positioned to secure panels of different thicknesses, a single inner frame member 230 may be manufactured and used for securing two different common thicknesses of transparent panels. As a result, manufacturing costs are reduced. In addition, the required number of on-hand inventory or components used to install or service a movable barrier with transparent panels is also reduced making transportation and storage of various components at jobsites easier. As a result, use of the disclosed lite frame assembly may reduce tooling costs and inventory management costs, thus improving the manufacturing process. The disclosed assembly also reduces installation or servicing complexity.

FIG. 3B is a cross-sectional side view of a panel 395*b* within the movable barrier 190 and positioned between the outer frame member 220 and the inner frame member 230, according to aspects of the present disclosure. The cross-sectional view shown in FIG. 3B may be shown by the cross-sectional arrows 3 in FIG. 2B. As shown in FIG. 3B, the outer frame member 220 and the inner frame member 230 may be in the same positions and include the same components as was shown and described with reference to FIG. 3A. However, the outer frame member 220 and the inner frame member 230 shown in FIG. 3B secure the panel 395*b* of a different thickness than the panel 395*a*.

The panel 395*b* may be a panel similar to the panel 395*a*, in that it may be a transparent or non-transparent panel constructed of any suitable material. However, the panel 395*b* may be of a thickness 398*b*. In some implementations, the thickness 398*b* may be ½ inches. However, the thickness 398*b* may be any suitable thickness. The thickness 398*b* may be greater than the thickness 398*a*.

The panel 395*b* may include an outward facing surface 396*b* and in inward facing surface 397*b*. In an installed configuration, the outward facing surface 396*b* of the panel 395*b* may contact the inward facing bearing surface 222 of the outer frame member 220. The inward facing surface 397*b* of the panel 395*b* may contact the bearing surface 234 of the inner frame member 230.

It is noted, that in some implementations, the panel 395*a* may be longer and wider than the panel 395*b*. For example, as shown in FIG. 3A, an outer edge of the panel 395*a* may extend farther into the recess created by outer frame member 220 and the inner frame member 230 such that the outer edge of the panel 395*a* is positioned closed to the movable barrier 190 than the outer edge of the panel 395*b*.

Figure 3C:
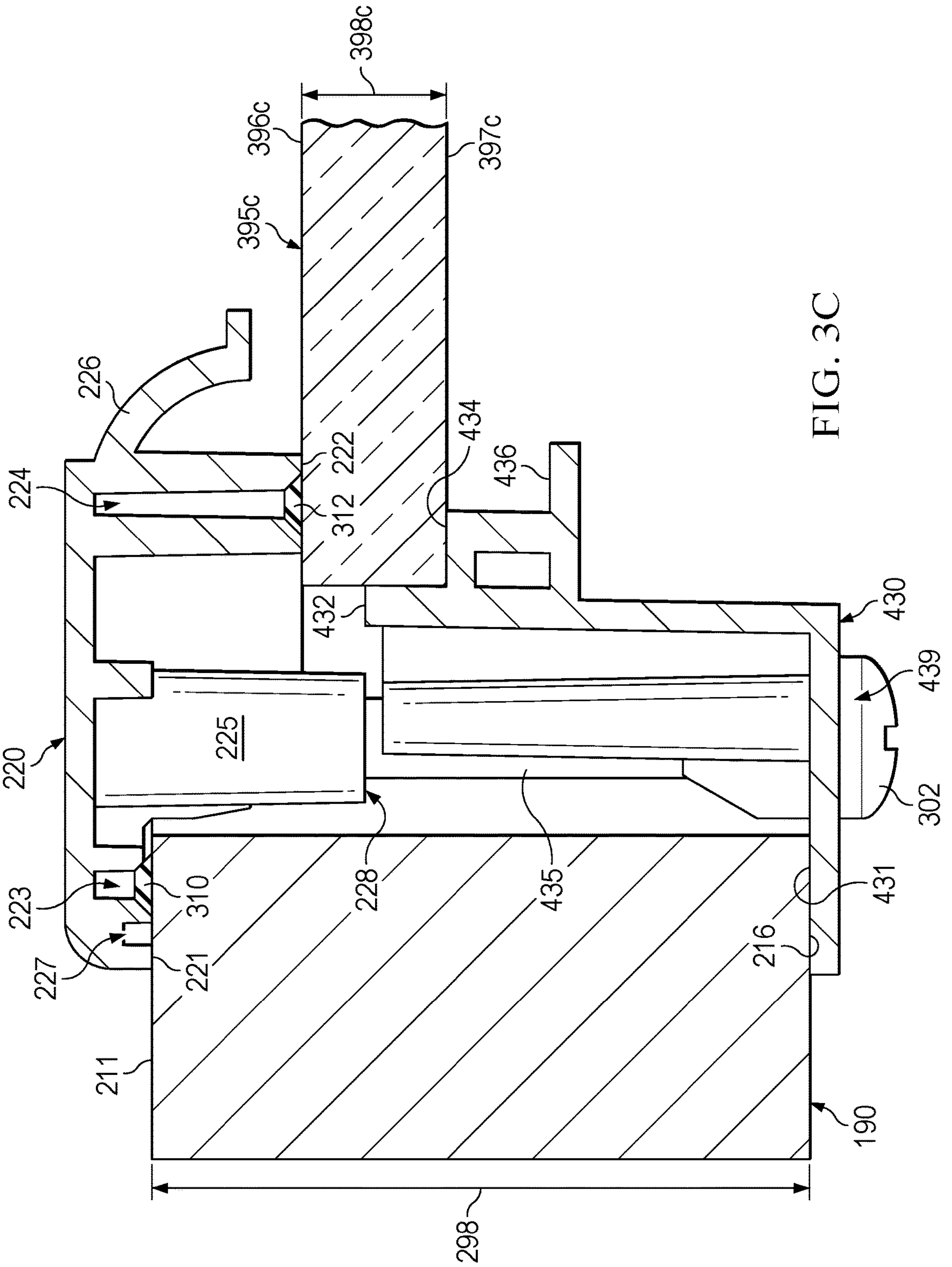
FIG. 3C is a cross-sectional side view of a panel within a movable barrier and positioned between an outer frame member and an inner frame member, according to aspects of the present disclosure.

FIG. 3C is a cross-sectional side view of a panel 395*c* within the movable barrier 190 and positioned between the outer frame member 220 and an inner frame member 430, according to aspects of the present disclosure. The cross-sectional view shown in FIG. 3C may be shown by the cross-sectional arrows 3 in FIG. 2B. FIG. 3C illustrates an additional or alternative inner frame member 430 which may be used to secure a panel 395*c*.

The movable barrier 190 and outer frame member 220 are also depicted in FIG. 3C. However, the inner frame member 430 may differ from the inner frame member 230. Like the inner frame member 230 previously described, the inner frame member 430 includes a surface 431 shaped and positioned to contact the inward facing surface 216 of the movable barrier 190 in an installed configuration. The inner frame member 430 may also include a region 435 with a recess 439. The region 435 may be similar to the region 235 of the inner frame member 230 and the recess 439 may be similar to the recess 239 of the inner frame member 230 described previously. Specifically, the recess 439 may receive the fastener 302 allowing the fastener 302 access to the recess 228 of the region 225. As the fastener 302 is positioned and tightened, the outer frame member 220 is urged toward the inner frame member 430 securing the panel 395*c* within the opening 212 (FIGS. 2A and 2B) of the movable barrier 190.

The inner frame member 430 may be sized and shaped to secure panels of three different thicknesses with the same outer frame member 220. For example, the inner frame member 430 may include a bearing surface 432, a bearing surface 434, and a bearing surface 436. The bearing surface 432 may be positioned similarly to the bearing surface 232 described with reference to the inner frame member 230 of FIG. 3A. In that regard, the bearing surface 432 may be sized and positioned so as to contact the inner surface 397*a* of the panel 395*a* (FIG. 3A) with the outer surface 396*a* contacting the bearing surface 222 of the outer frame member 220. The bearing surface 436 may be sized and shaped to contact the inner surface 397*b* of the panel 395*b* (FIG. 3B) with the outer surface 396*b* contacting the bearing surface 222 of the outer frame member 220. The bearing surface 434 may be positioned between the bearing surface 432 and the bearing surface 436 such that a panel of a third thickness may be secured in addition to the panels 395*a* and 395*c*.

For example, the bearing surface 434 may be sized and shaped to contact an inner surface 397*c* of a panel 395*c*. The bearing surface 222 of the outer frame member 220 may contact an outer surface 396*c* of the panel 395*c*. As shown in FIG. 3C, the panel 395*c* may be of a thickness 398*c*. In that regard, the position of the bearing surface 434 of the inner member 430 may be determined such that a distance between the bearing surface 434 of the inner frame member 430 and the bearing surface 222 of the outer frame member 220 is substantially equal to the thickness 398*c* of the panel 395*c*. In this way, when the outer frame member 220 and inner frame member 430 are in an installed configuration, they grip a portion of the movable barrier 190 and secure the panel 395*c* in place.

Figure 3D:
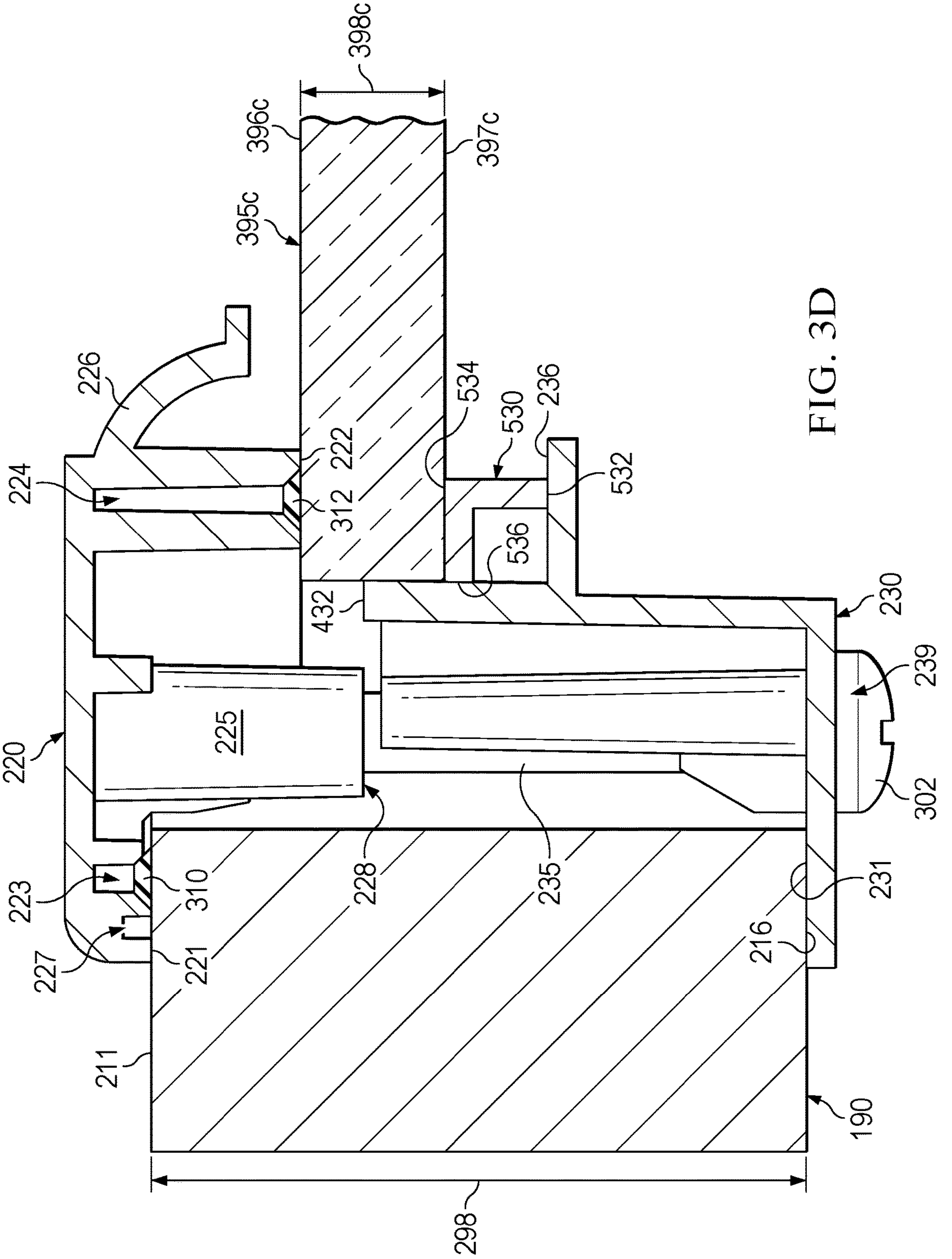
FIG. 3D is a cross-sectional side view of a panel within a movable barrier and positioned between an outer frame member, an inner frame member, and an intermediate frame, according to aspects of the present disclosure.

FIG. 3D is a cross-sectional side view of the panel 395*c* within the movable barrier 190 and positioned between the outer frame member 220, the inner frame member 230, and an intermediate frame 530, according to aspects of the present disclosure. The cross-sectional view shown in FIG. 3E may be shown by the cross-sectional arrows 3 in FIG. 2B. FIG. 3D illustrates an additional intermediate frame 530 which may be used to secure the panel 395*c*. In some aspects, the intermediate frame 530 may additionally be referred to as a shim or a spacer.

As shown in FIG. 3D, the additional intermediate frame 530 may enable the outer frame member 220 and the inner frame member 230 to secure the panel 395*c* of the intermediate thickness 398*c*. For example, during installation of the panel 395*c* within the opening 212 (FIGS. 2A and 2B), the intermediate frame 530 may be positioned contacting the inner frame 230. For example, as shown in FIG. 3D, the intermediate frame 530 may include a surface 532, a surface 534, and a surface 536. The intermediate frame 530 may be positioned relative to the inner frame 230 such that the surface 532 contacts the surface 236 of the inner frame 230 and the surface 536 contacts a vertical surface of the inner frame 230. In this position, the surface 534 may contact the surface inner surface 397*c* of the panel 395*c*.

As shown in FIG. 3D, when the outer frame member 220 and inner frame member 230 are urged toward one another, for example, by the fastener 302, with the intermediate frame 530 installed as described relative to the inner frame 230, the intermediate frame 530 and outer frame 220 may grip an outer perimeter portion of the panel 395*c* securing it in place. Similarly, the outer frame 220 and inner frame 230 may grip a portion of the movable barrier 190. In some aspects, the intermediate frame 530 may be affixed to the inner frame 230 by an adhesive or any other fastener. In some aspects, the intermediate frame 530 may be affixed between the surface 236 of the inner frame 230 and the panel 395*c* without adhesive. For example, the force applied by the fastener 302 urging the outer frame 220 and inner frame 230 together may secure the intermediate frame 530 in place.

Figure 3E:
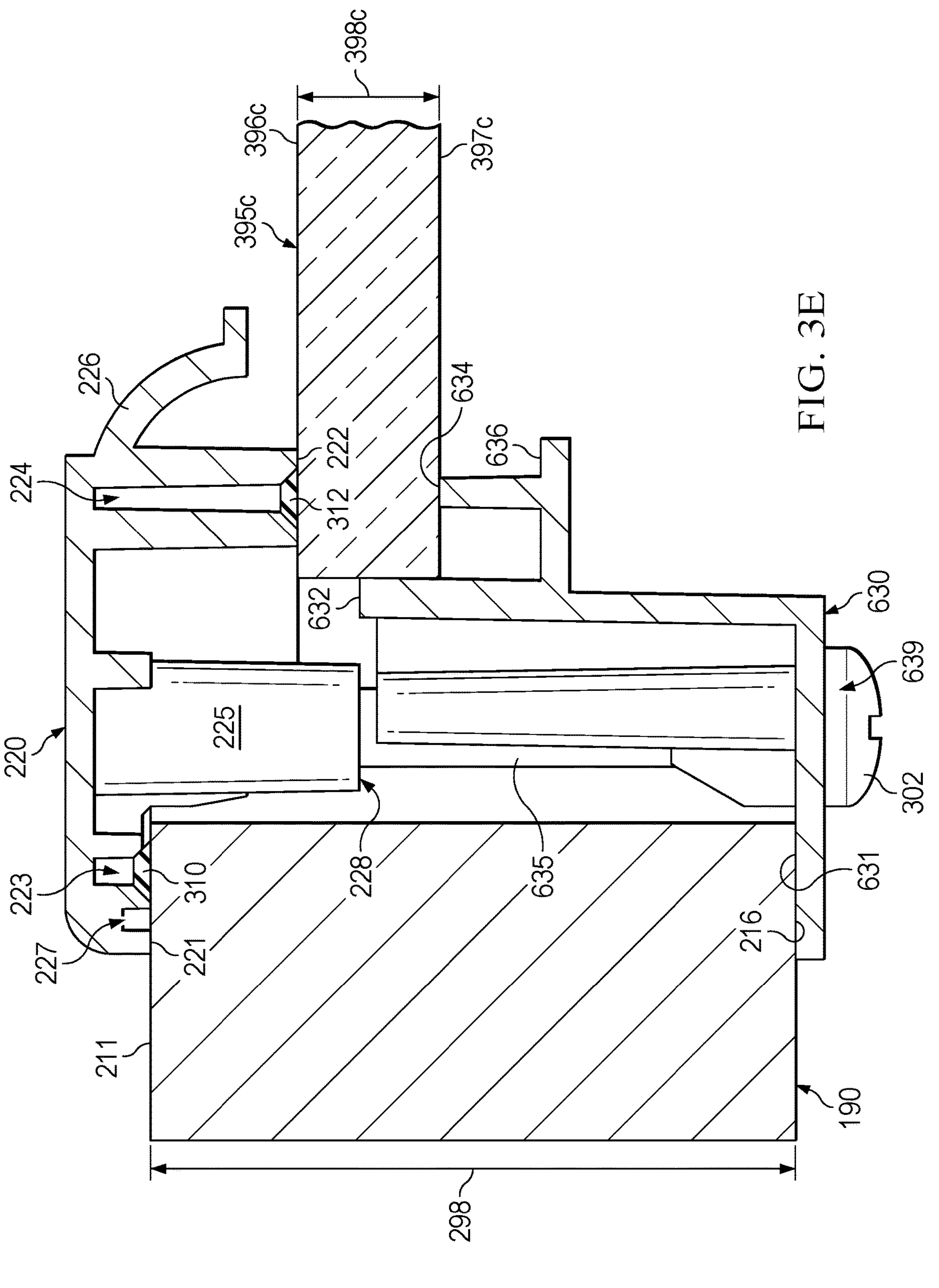
FIG. 3E is a cross-sectional side view of a panel within a movable barrier and positioned between an outer frame member and an inner frame member, according to aspects of the present disclosure.

FIG. 3E is a cross-sectional side view of the panel 395*c* within the movable barrier 190 and positioned between the outer frame member 220 and an inner frame member 630, according to aspects of the present disclosure. The cross-sectional view shown in FIG. 3E may be shown by the cross-sectional arrows 3 in FIG. 2B. FIG. 3E illustrates an additional or alternative inner frame member 630 which may be used to secure the panel 395*c*.

The movable barrier 190 and outer frame member 220 are also depicted in FIG. 3E. However, the inner frame member 630 may differ from the inner frame member 230 and/or the inner frame member 430. Like the inner frame members previously described, the inner frame member 630 includes a surface 631 shaped and positioned to contact the inward facing surface 216 of the movable barrier 190 in an installed configuration. The inner frame member 630 may also include a region 635 with a recess 639. The region 635 may be similar to the region 235 of the inner frame member 230 and the recess 639 may be similar to the recess 239 of the inner frame member 230 described previously. Specifically, the recess 639 may receive the fastener 302 allowing the fastener 302 access to the recess 228 of the region 225. As the fastener 302 is positioned and tightened, the outer frame member 220 is urged toward the inner frame member 630 securing the panel 395*c* within the opening 212 (FIGS. 2A and 2B) of the movable barrier 190.

Like the inner frame member 430, the inner frame member 630 may be sized and shaped to secure panels of three different thicknesses with the same outer frame member 220. For example, the inner frame member 630 may include a bearing surface 632, a bearing surface 634, and a bearing surface 636. The bearing surface 632 may be positioned similarly to the bearing surface 232 described with reference to the inner frame member 230 of FIG. 3A. In that regard, the bearing surface 632 may be sized and positioned to contact the inner surface 397*a* of the panel 395*a* (FIG. 3A) with the outer surface 396*a* contacting the bearing surface 222 of the outer frame member 220. The bearing surface 636 may be sized and shaped to contact the inner surface 397*b* of the panel 395*b* (FIG. 3B) with the outer surface 396*b* contacting the bearing surface 222 of the outer frame member 220. The bearing surface 634 may be positioned between the bearing surface 632 and the bearing surface 636 such that a panel of a third thickness may be secured in addition to the panels 395*a* and 395*c*.

For example, the bearing surface 634 may be sized and shaped to contact an inner surface 397*c* of a panel 395*c*. The bearing surface 222 of the outer frame member 220 may contact an outer surface 396*c* of the panel 395*c*. As shown in FIG. 3E, the panel 395*c* may be of a thickness 398*c*. In that regard, the position of the bearing surface 634 of the inner member 630 may be determined such that a distance between the bearing surface 634 of the inner frame member 630 and the bearing surface 222 of the outer frame member 220 is substantially equal to the thickness 398*c* of the panel 395*c*. In this way, when the outer frame member 220 and inner frame member 630 are in an installed configuration, they grip a portion of the movable barrier 190 and secure the panel 395*c* in place.

Persons of ordinary skill in the art will appreciate that the implementations encompassed by the present disclosure are not limited to the particular exemplary implementations described above. In that regard, although illustrative implementations have been shown and described, a wide range of modification, change, combination, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A bracket set usable to secure a first panel having a first thickness or a second panel having a second thickness in a movable barrier, the bracket set comprising:
- an inner frame member comprising:
  - a first barrier-facing surface configured to contact an inner-facing side of the movable barrier;
  - a first panel-facing surface configured to contact a first side of the first panel having the first thickness;
  - a second panel-facing surface configured to contact a first side of the second panel having the second thickness, wherein the second thickness is different than the first thickness; and
- an outer frame member comprising:
  - a second barrier-facing surface configured to contact an outer-facing side of the movable barrier; and
  - a third panel-facing surface configured to contact an opposing second side of the first panel having the first thickness when the bracket set is used with the first panel and configured to contact an opposing second side of the second panel having the second thickness when the bracket set is used with the second panel.

2. The bracket set of claim 1, wherein the inner frame member further comprises a fourth panel-facing surface configured to contact a first side of a third panel having a third thickness, and wherein the third panel-facing surface is further configured to contact an opposing second side of the third panel having the third thickness when the bracket set is used with the third panel.

3. The bracket set of claim 1, wherein the first panel and the second panel are transparent.

4. The bracket set of claim 3, wherein the first panel and the second panel are glass panels.

5. The bracket set of claim 1, further comprising a sealant positioned between the second barrier-facing surface and the outer-facing side of the movable barrier.

6. The bracket set of claim 1, further comprising a sealant positioned between the third panel-facing surface and the opposing second side of the first panel when the bracket set is used with the first panel or positioned between the third panel-facing surface and the opposing second side of the second panel when the bracket set is used with the second panel.

7. The bracket set of claim 1, wherein the second barrier-facing surface of the outer frame member further comprises a groove configured to receive a seal.

8. The bracket set of claim 1, wherein the third panel-facing surface of the outer frame member further comprises a groove configured to receive a seal.

9. The bracket set of claim 1, wherein the inner frame member further comprises a recess configured to receive a fastener, and wherein the outer frame member further comprises a recess configured to receive the fastener.

10. The bracket set of claim 9, wherein the fastener is configured to secure the outer frame member and the inner frame member to the first panel when the bracket set is used with the first panel or secure the outer frame member and the inner frame member to the second panel when the bracket set is used with the second panel.

11. A bracket set usable to secure a first panel having a first thickness or a second panel having a second thickness in a movable barrier, the bracket set comprising:
- an inner frame member securable relative to an inner-facing side of the movable barrier, the inner frame member comprising:
  - a first surface configured to contact a first side of the first panel having the first thickness;
  - a second surface configured to contact a first side of the second panel having the second thickness, wherein the second thickness is different than the first thickness; and
- an outer frame member securable relative to an outer-facing side of the movable barrier, the outer frame member comprising:
  - a third surface configured to contact an opposing second side of the first panel having the first thickness when the bracket set is used with the first panel and configured to contact an opposing second side of the second panel having the second thickness when the bracket set is used with the second panel.

12. The bracket set of claim 11, wherein the first thickness is ⅛ inches.

13. The bracket set of claim 11, wherein the second thickness is ½ inches.

14. The bracket set of claim 11, wherein the inner frame member further comprises a fourth panel-facing surface configured to contact a first side of a third panel having a third thickness, and wherein the third panel-facing surface is further configured to contact an opposing second side of the third panel having the third thickness when the bracket set is used with the third panel.

15. A bracket set usable to secure a plurality of panels of a plurality of thicknesses to a movable barrier of a first thickness, the bracket set comprising:

an inner frame member comprising:

a first barrier-facing surface configured to contact an inner-facing side of a movable barrier; and a plurality of panel-facing surfaces, each of the plurality of panel-facing surfaces configured to selectively contact a respective first side of a corresponding panel of the plurality of panels when the corresponding panel is utilized with the movable barrier, wherein each corresponding panel of the plurality of panels has a different thickness; and an outer frame member comprising:

a second barrier-facing surface configured to contact an outer-facing side of the movable barrier; and a second panel-facing surface configured to contact an opposing second side of each of the plurality of panels.

16. The bracket set of claim 15, wherein:

the plurality of panels includes a first panel having a first thickness;

the plurality of panel-facing surfaces includes a first panel-facing surface configured to contact a first side of the first panel; and the second panel-facing surface of the outer frame member is configured to contact an opposing second side of the first panel.

17. The bracket set of claim 16, wherein:

the plurality of panels includes a second panel having a second thickness;

the plurality of panel-facing surfaces includes a second panel-facing surface configured to contact a first side of the second panel; and the second panel-facing surface of the outer frame member is configured to contact an opposing second side of the second panel.

18. The bracket set of claim 17, wherein the plurality of panels includes a third panel having a third thickness, and wherein the bracket set further comprises:

an intermediate frame member comprising:

a first surface configured to contact the second panel-facing surface of the inner frame member; and a second panel-facing surface configured to contact a first side of the third panel; and wherein the second panel-facing surface of the outer frame member is configured to contact an opposing second side of the third panel.

19. The bracket set of claim 15, wherein the second barrier-facing surface of the outer frame member further comprises a groove configured to receive a seal.

20. The bracket set of claim 15, wherein the second panel-facing surface of the outer frame member further comprises a groove configured to receive a seal.

21. The bracket set of claim 15, wherein the inner frame member further comprises a recess configured to receive a fastener, wherein the fastener is configured to secure the outer frame member and the inner frame member to at least one corresponding panel of the plurality of panels.

22. A bracket set for securing a panel on a door, comprising:

a first frame member comprising a first bearing surface configured to bear against a first surface of the panel; and a second frame member comprising:

a second bearing surface spaced a first distance from the first bearing surface when the first frame member and the second frame member are in place on the door, the second bearing surface configured to selectively bear against a second surface of the panel when the panel has a first thickness, and a third bearing surface spaced a second distance from the first bearing surface when the first frame member and the second frame member are in place on the door, the third bearing surface configured to bear against the second surface of the panel when the panel has a second thickness, wherein the second thickness is different than the first thickness.

* * * * *